March 18, 1930. M. O. SEM ET AL 1,751,177
PROCESS IN THE MANUFACTURE OF SELF BAKING ELECTRODES
Filed Dec. 6, 1928
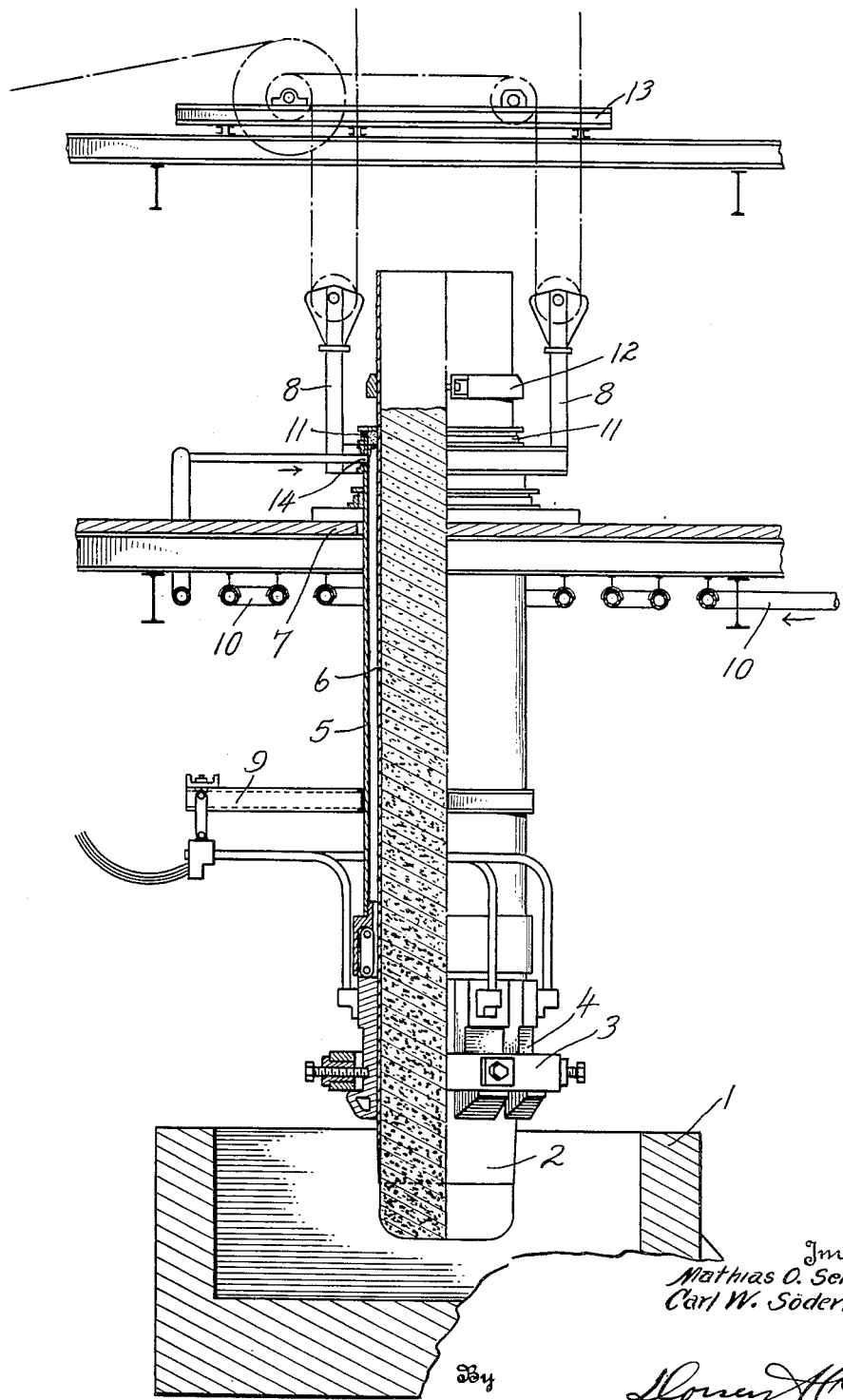
Inventors
Mathias O. Sem, and
Carl W. Söderberg.
By
Lloyd H. Cole
Attorneys Patented Mar. 18, 1930

1,751,177

UNITED STATES PATENT OFFICE

MATHIAS OVROM SEM, OF BUFFALO, NEW YORK, AND CARL WILHELM SÖDERBERG, OF OSLO, NORWAY, ASSIGNORS TO DET NORSKE AKTIESELSKAB FOR ELEKTROKEMISK INDUSTRI OF NORWAY, OF OSLO, NORWAY

PROCESS IN THE MANUFACTURE OF SELF-BAKING ELECTRODES

Application filed December 6, 1928, Serial No. 324,171, and in Germany September 26, 1928.

The present invention deals with the manufacture of electrodes that are baked during use in the electric furnace. Such electrodes have been called self-baking electrodes. They are made by filling raw electrode paste into a form or mantle which ordinarily is made from sheet iron. This form shapes the electrode and holds the same together until it is baked. In order to compensate for the wear of the electrode in the furnace, new paste is added to the top of the electrode as the lower end wears off in the furnace.

Owing to the conditions under which these electrodes are made, it has been found to be of advantage to use a paste having such consistency as to be elastic and non-tampable, such for instance as the paste that has been described in U. S. Patent No. 1,670,052, to Soderberg. It is of particular importance that this electrode paste has sufficiently low viscosity to settle in the electrode during the baking without the necessity of applying high pressure or heavy blows. The paste should therefore have a relatively high proportion of binder, such as tar and pitch. These materials have a much lower viscosity at higher temperatures than when cold. It has been the practice heretofore, in order to fill the paste into the electrode, to heat it to a temperature above the melting point of the binder materials and apply it while hot. It is possible, however, to make a paste without heating if a suitable pitch is used as a binder, in which case, the materials can be mixed with the pulverized pitch at ordinary temperatures without any heating. In this case, the paste, when ready mixed, is still a powder. So far, however, this paste also has always been heated before being filled into the electrode. The hot paste has been pressed or rammed mechanically into the electrode, for which purpose either pneumatic or hand rammers have been used. The paste takes more or less ramming, depending upon its viscosity. The heating of the paste has ordinarily been carried out in special heating ovens, where the paste has been filled in in blocks, and heated to a temperature of 100° to 140° C. at which temperature the paste has been filled into the electrode.

The present invention has for its principal object a process whereby this previous heating of the paste is avoided. The inventors have found it is possible to fill properly prepared cold paste directly into the electrode without pre-heating, and then apply heat to the paste after its addition to the electrode, and have provided an arrangement such that the paste is heated to above the melting point of the binder material after being filled into the electrode. The paste will, of course, become heated in any case during its passage towards the baked end of the electrode. But ordinarily the holder is water cooled, and stops the heat flow in the electrode. Furthermore, in order to have the best results, it is important to melt the paste in the upper end of the electrode so as to have the weight of a long column of paste pressing on the baking zone. If the paste is filled in cold it is therefore important to apply heat in the upper end of the electrode.

This heating can be carried out in different ways. For open furnaces, the electrode is made above a platform, which is arranged over the furnace. Underneath the platform, the electrode is exposed to the heat of the electric furnace. In such cases, it is frequently sufficient to let this heat do the melting of the paste in the electrode. In many cases, the self-baking electrodes in open furnaces have been provided with a cooled dust shield, however, as described in U. S. Patent No. 1,691,505 to Walther. The same counteracts the melting of the paste in the electrode. One can improve this condition by leaving out the cooling in the upper part of the dust shield. If it is necessary to use a special means for artificially heating the paste in the electrode, this can be accomplished by using either gas or electricity. Such heating can be done either from the outside of the electrode, or inside the same, for instance, by arranging electric heating elements that go down into the electrode paste. These can be operated in such a way that the paste is filled in at night, whereafter the heating elements are turned on, giving enough heat to melt the paste during the night. In order to save heat, one may heat insulate the top of the electrode.

The paste can be allowed to settle all by itself, or else a mechanical treatment of the electrode by pneumatic rammers or similar equipment, can be applied.

An illustration of one method of heating the top of the electrode, where an air-cooled dust shield is used, is to let the air pass through iron pipes, arranged below the platform, before it is forced into the dust shield. Thereby, the air can be pre-heated to any desired extent, and we have shown such an arrangement in the accompanying drawing.

The drawing represents an elevational view, partly in section, of a furnace installation in which the invention may be carried out.

In the illustration, which shows an adaptation to the present invention, of one form of installation shown in the aforesaid Walther patent, 1 is an electric furnace, 2 is a self-baking electrode, and 3 is a ring having means for tightening the electrode gripping members 4. The gripping members are suspended in the lower end of the casing 5 which is placed outside of the actual electrode mantle 6, and is led through the floor of the tamping house 7, and at its upper end is fastened to the suspension element 8 which may be raised and lowered in known manner. A stuffing box 11 is at the upper end of the casing, against which a stopping ring 12 may engage when the electrode has moved through its maximum "drop". A displaceable frame is indicated at 13, through the operation of which the electrode may be bodily moved about. To the casing 5 is fastened a carrier arrangement 9 for the electric leads conducting current to the electrode. In order to heat the upper portion of the electrode, to raise the temperature of the paste which is fed in at such upper end, air may be blown in through the pipe 10 suspended from the floor of the tamping house, and therefore subjected to the heat of the furnace, such air as it passes through the convolutions of the pipe becoming heated, and this heated air may be introduced at 14 near the upper end of the casing to thereby occupy the space between the casing and mantle and heat the latter as it penetrates downward to pass out at the lower end of the casing. The air is preferably heated to about 100° to 200° C., the temperature chosen depending upon the particular paste being used, and the temperature to which it is found most desirable to heat the paste for the purposes hereinbefore set forth. The desired temperature may be attained by controlling the speed of the in-blown air, or by determining the length of pipe exposed to the heat of the furnace through which the air passes, or in other desirable manner.

It will easily be understood that the above procedure will operate to best advantage if an electrode paste is used, which will become sufficiently fluid when exposed to heat in the electrode. Such paste has been described in the before mentioned Patent No. 1,670,052. It should be sufficiently soft at the temperatures in the electrode to be elastic and non-tampable. If the same is used, any mechanical treatment of the paste in the electrode can be avoided.

Having thus described our invention what we claim as new and desire to secure by Letters Patent is:—

1. The process of forming an electrode baked while in use in the electric furnace and including electrode paste and an enclosing mantle comprising filling in paste at temperatures below the melting point of the binder material, applying heat to the filled in paste and causing the paste to flow and form a solid electrode.

2. The process of forming an electrode baked while in use in the electric furnace and including electrode paste and an enclosing mantle comprising filling in paste at temperatures below the melting point of the binder material, applying heat to the filled in paste thereby softening the paste and applying mechanical ramming or pressing so as to make the paste form a solid electrode.

3. The process of forming an electrode baked while in use in the electric furnace and including electrode paste and an enclosing mantle comprising heating the upper end of the electrode by air or gas of a temperature of about 100°–200° C.

4. The process of forming an electrode baked while in use in the electric furnace and including electrode paste and an enclosing mantle, comprising adding paste to the upper portion of the electrode at temperatures below the melting point of the binder content of the paste, and heating the added paste to a temperature sufficiently high to melt the binder and cause the paste to flow and form a solid electrode.

5. The process of forming an electrode baked while in use in the electric furnace and including electrode paste and an enclosing mantle or form comprising filling paste into the electrode at temperatures below the melting point of the binder materials and applying heat to the filled in paste after its addition to the electrode, said paste having a binder content sufficiently high to render the paste elastic and non-tampable at the temperature in the electrode thereby causing the paste to flow and form a solid electrode.

6. The process of forming an electrode baked while in use in the electric furnace and including electrode paste and an enclosing mantle comprising adding paste to the upper unbaked end of the electrode at temperatures below the melting point of the binder, and subjecting the added paste to heat, other than the heat generated in the electrode, to cause the paste to flow and form a solid electrode.

7. The combination of an electrode baked while in use in the electric furnace including electrode paste and an enclosing mantle, a holder adjacent the lower baked portion of the electrode for introducing current thereto, a heater adjacent the zone of the electrode above the holder, and means to heat the heater to thereby cause the paste in such zone to flow and form a solid electrode.

In testimony whereof we hereunto affix our signatures.

MATHIAS OVROM SEM.
CARL WILHELM SÖDERBERG.